Figure 1:
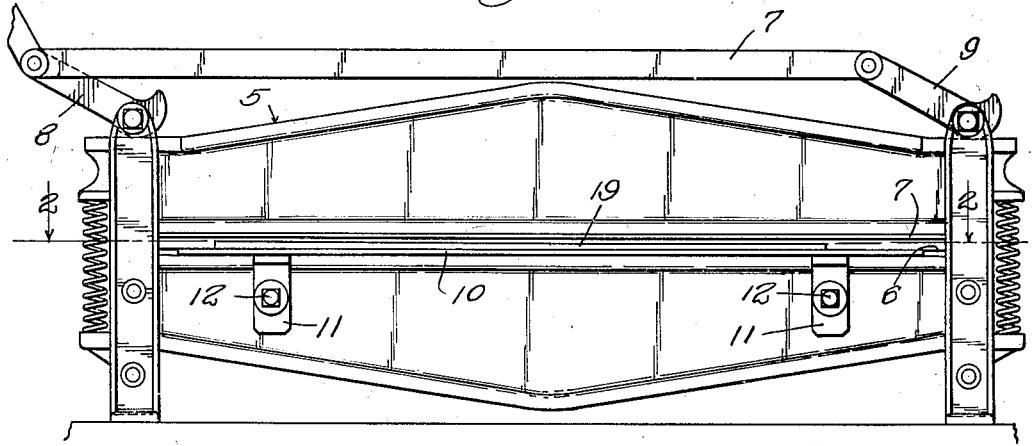

Dec. 13, 1949   E. L. WILLIAMS   2,490,989
GAUGE FOR TILE CUTTERS
Filed July 29, 1947

Inventor
Elmer L. Williams

Patented Dec. 13, 1949

2,490,989

UNITED STATES PATENT OFFICE 2,490,989

GAUGE FOR TILE CUTTERS

Elmer Lessley Williams, Melrose Park, Ill.

Application July 29, 1947, Serial No. 764,319

16 Claims. (Cl. 125—23)

This invention relates to a gauge for tile cutters.

In the process of preparing tile for flooring or other purposes it is necessary to cut large sections of tile into pieces the proper size to fit a border, or other restricted space. This is accomplished by the use of a cutter in which a movable blade which is arranged to move parallel to a fixed blade cuts the tile against the fixed blade, which serves as an anvil. The motion of the movable blade with respect to the fixed blade is of the guillotine type because the material to be cut is extremely stiff and quite brittle, and a scissors action would not cut it evenly.

In order to permit measuring of the material to be cut, such cutters have customarily been provided with a cutting gauge which consists of a pair of slotted brackets rigidly secured to the cutter adjacent the fixed blade, with a gauge stop adjustably secured to the brackets by means of wing nuts. This type of gauge has never been very satisfactory because the cutter blades are wedge shaped, and in cutting the tile they push it into the gauge stop with sufficient force that the stop may require resetting after every cut. Likewise, the operator must ordinarily set the gauge stop initially by measuring from the blades with a ruler, or by using a piece of tile of known width for a guide.

In the improved gauge of this invention, a base member is provided with pairs of spaced apertures which are adapted to receive a pair of spaced pins on the gauge stop. The first pair of apertures is a predetermined distance, for example one inch, from the blades. Other pairs of spaced apertures are arranged successively farther from the blades in spacings of a fraction of a linear unit, as, for example, one-quarter inch. Thus the gauge stop may be quickly set at any predetermined distance from the blades, and once placed it will remain fixed until the operator desires to change the spacing. This arrangement saves a tremendous amount of time in the cutting of tile and assures accuracy and uniformity in the cut pieces.

The base member is bolted to the cutter at the places provided for the reception of the slotted brackets. A compression spring is provided under each bolt to yieldably hold the base member against the cutter. Thus the powerful wedging force of the blades against the tile, tending to split the tile against the rigid gauge stop, is absorbed by the compression spring which permits limited movement of the entire gauge.

In order to accommodate the gauge to irregularities in various cutters, a plurality of set screws is positioned to permit adjustment of the gauge with respect to the blades, so as to assure parallelism of the gauge stop and blades.

Figure 2:
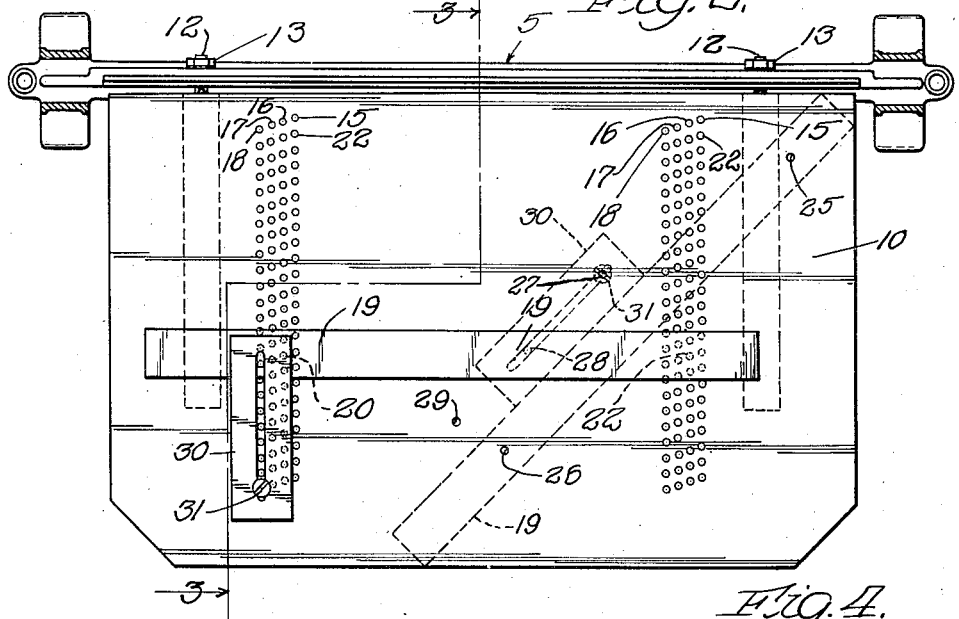
Figures 3, 4:
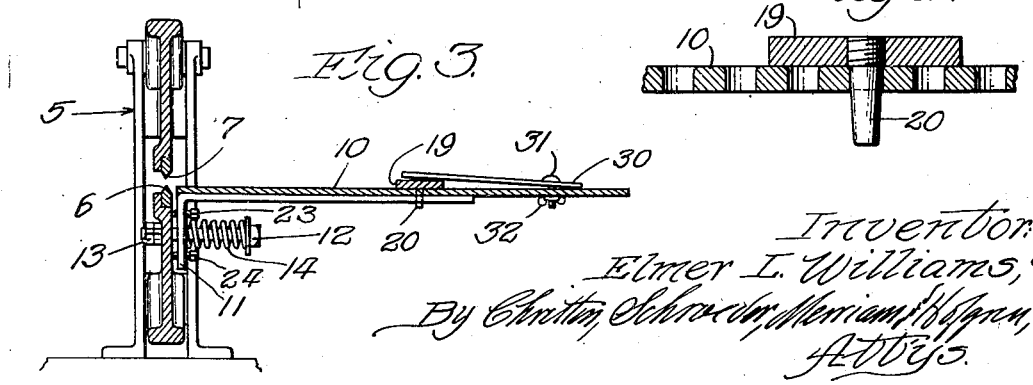

The invention is illustrated in a preferred embodiment in the accompanying drawings, in which:

Fig. 1 is a front elevation of an asphalt tile flooring cutter equipped with the improved gauge; Fig. 2 is a section taken as indicated at 2—2 of Fig. 1 with an alternative location of the gauge stops indicated by broken lines; Fig. 3 is a section taken as indicated at 3—3 of Fig. 2; and Fig. 4 is a fragmentary section of the apertures and a gauge stop pin.

Referring to the drawings in greater detail, an asphalt tile flooring cutter, indicated generally at 5, is provided with a cutting element consisting of a fixed blade 6 and a movable blade 7 which is mounted for movement parallel to the fixed blade 6 by means of parallel links 8 and 9.

The improved cutter gauge consists of a base member 10 having at its forward edge portion fastening elements composed of a pair of mounting lugs 11, each apertured to receive a bolt 12. The bolts 12 extend through the mounting lugs 11 and through apertures in the lower portion of the cutter 5, and are secured in place by means of nuts 13. Compression springs 14 are mounted between the heads of the bolts 12 and the mounting lugs 11 so as to resiliently urge the base member 10 toward the cutting element. Thus the fastening elements for the base member 10 permit limited horizontal movement of the base member in a direction perpendicular to the plane of the cutting elements, and the base member 10 is yieldingly held in place by the springs 14.

The base member is provided with a plurality of integral evenly spaced pairs of shoulders, consisting, in the embodiment shown, of a plurality of pairs of spaced apertures 15, 15; 16, 16; 17, 17; 18, 18; etc. A gauge stop 19 is provided with spaced taper pins 20 and 21. Each pair of spaced apertures, as 15, 15, is arranged to receive the pins 20 and 21, the pins 20 and 21 fitting the apertures snugly so as to retain the gauge stop 19 rigidly in any selected position. The first pair of spaced apertures, 15, 15, is placed a selected distance from the forward edge of the base member 10, as for example, one inch. The second pair of spaced apertures 16, 16, is offset sideways from the first pair and is a fractional linear unit farther from the forward edge of the base member 10 than is the first pair. Successive pairs, as 17, 17; 18, 18, are in an arrangement similar to said first and second pairs so as to permit adjustment of the gauge stop in fractional linear units smaller than the width of an aperture. Thus, in one embodiment of the invention there is a distance of one-half inch between the apertures 15, 15 and the next apertures 22, 22 in the same column of apertures. The offsetting of the apertures 16, 17, and 18, permits one-eighth inch adjustments of the gauge bar 19 with respect to the forward edge of the base member 10, even though the width of an aperture is considerably greater than one-eighth inch.

It is desirable to place the forward edge of the base member 10 a predetermined distance from the cutting element, and this forward edge must necessarily be precisely parallel to the cutting element. In order to provide for this adjustment, the fastening means includes a plurality of set screws 23 and 24 extending through apertures in the mounting lugs 11, said set screws being independently movable. The set screws 23 and 24 are adapted to be locked in place in the mounting lugs 11 so that once the base member 10 has been adjusted to any particular cutter, it may be removed and replaced thereon without readjustment of the set screws.

In order to permit tile to be cut at a 45° angle, as is frequently necessary, apertures 25 and 26 are provided to receive the pins 20 and 21 to hold the gauge stop 19 at a 45° angle with respect to the blades, as shown by the broken lines in Fig. 2. Apertures 27, 28 and 29, on a line parallel to that between the apertures 25 and 26, permit an auxiliary stop 30 to be fixed with its long side in abutting relationship to the gauge stop 19 in order to furnish a right angle abutment at any desired distance from the blades. Thus a rectangular piece of tile may be cut off on a 45° angle at any distance from a corner. The auxiliary stop 30 consists of a slotted plate which may be secured to the base member by means of a bolt 31 and wing nut 32.

When not in use, the auxiliary stop 30 may be secured out of the way by bolting it into any of the apertures in the base member; and when the gauge is not in use it may be bolted down with one end over the gauge stop 19, as shown in Fig. 2, to act as a locking plate to prevent loss of the gauge stop.

The foregoing detailed description has been given for clearness of understanding only, and no unnecessary limitations should be understood therefrom, as some modifications will be obvious to those skilled in the art.

I claim:

1. A gauge for a tile cutter, comprising: a base member; fastening elements for detachably securing said base member in predetermined relation to the blades of a tile cutter; a plurality of spaced pairs of shoulders integral with said base member; and a movable gauge stop having integral portions adapted to frictionally engage a selected pair of said shoulders to fixedly retain said stop in a predetermined position with reference to said blades.

2. A gauge for a tile cutter, comprising: a base member; fastening elements for detachably securing said base member in predetermined relatition to the blades of a tile cutter; a gauge stop provided with a pair of rigid spaced pins; and a plurality of pairs of spaced apertures in said base member adapted to receive and frictionally grip said spaced pins, said pairs of apertures being so arranged as to permit said gauge stop to be secured at selected distances from said blades.

3. A gauge as set forth in claim 2 wherein a first pair of spaced apertures is located a predetermined distance from said blades, a second pair of spaced apertures is offset sideways from said first pair and is a fractional linear unit farther from the blades than is said first pair, and successive pairs are in an arrangement similar to said first and second pairs so as to permit adjustment of the gauge stop in fractional linear units smaller than the width of an aperture.

4. A gauge for a tile cutter, comprising: a base member; fastening elements for securing said base member in predetermined relation to the blades of a tile cutter, said elements being adapted to permit limited horizontal movement of the base member in a direction generally perpendicular to the cutting plane of the blades; a compressive member resiliently urging the base member toward the cutting elements; a plurality of spaced pairs of shoulders integral with said base member; and a gauge stop having portions adapted to engage a selected pair of said shoulders to fixedly retain said stop in a predetermined position with reference to said blades.

5. A gauge as set forth in claim 4 wherein the fastening elements include a plurality of set screws positioned to provide for adjustment of the base member with respect to the cutting element.

6. A gauge for a tile cutter, comprising: a base member; fastening elements for securing said base member in predetermined relation to the blades of a tile cutter; a plurality of set screws associated with said fastening elements, said set screws being positioned to provide for adjustment of the base member with respect to the blades; a plurality of evenly spaced pairs of shoulders integral with said base member; and a gauge stop having portions adapted to engage a selected pair of said shoulders to fixedly retain said stop in a predetermined position with reference to said blades.

7. A gauge for a tile cutter, comprising: a base member; fastening elements for securing said base member in predetermined relation to the blades of a tile cutter, said elements being adapted to permit limited horizontal movement of the base member in a direction perpendicular to the plane of the cutting elements; a compressive member resiliently urging the base member toward the cutting elements; a gauge stop provided with a pair of rigid spaced pins; and a plurality of pairs of spaced apertures in said base member adapted to receive and grip said spaced pins, said pairs of apertures being so arranged as to permit said gauge stop to be secured at predetermined distances from said blades.

8. A gauge as set forth in claim 7 wherein the fastening elements include a plurality of set screws positioned to provide for adjustment of the base member with respect to the cutting element.

9. A gauge as set forth in claim 8 wherein a first pair of spaced apertures is located a predetermined distance from said blades, a second pair of spaced apertures is offset sideways from said first pair and is a fractional linear unit farther from the blades than is said first pair, and successive pairs are in an arrangement similar to said first and second pairs so as to permit adjustment of the gauge stop in fractional linear units smaller than the width of an aperture.

10. A gauge for a tile cutter, comprising: a base member; fastening elements for securing said base member in predetermined relationship to the blades of a tile cutter; a plurality of set screws associated with said fastening means, said set screws being positioned to provide for adjustment of the base member with respect to the blades; a gauge stop provided with a pair of rigid spaced pins; and a plurality of pairs of spaced apertures in said base member adapted to receive and grip said spaced pins, said pairs of apertures being so arranged as to permit said gauge stop to be secured at predetermined distances from said blades.

11. A gauge for a tile cutter, comprising: a base member; fastening elements for securing said base member in predetermined relationship to the blades of a tile cutter, said elements being adapted to permit limited horizontal movement of the base member in a direction generally perpendicular to the plane of the blades; a compressive member resiliently urging the base member toward the blades; a gauge stop adapted to be secured to said base member; and coacting elements for permitting said gauge stop to be secured to the base member at any selected distance from the cutting elements.

12. A gauge as set forth in claim 11 wherein the fastening means includes a plurality of set screws positioned to provide for adjustment of the base member with respect to the blades.

13. A gauge for a tile cutter, comprising: a base member; fastening elements for securing said base member in predetermined relation to the blades of a tile cutter; a plurality of spaced pairs of shoulders integral with said base member, both shoulders of each of said pairs being equidistant from the blades; a pair of shoulders disposed at a predetermined acute angle with respect to the blades; a gauge stop having portions adapted to engage a selected pair of said shoulders to fixedly retain said stop in a predetermined position with reference to said blades; an auxiliary stop adapted to engage a shoulder; and a shoulder positioned to fix said auxiliary stop in parallel abutting relation to said gauge stop when the gauge stop is retained by said last named pair of shoulders.

14. A gauge for a tile cutter, comprising: a base member; fastening elements for detachably securing said base member in predetermined relation to the blades of a tile cutter; a movable gauge stop; and coacting abutment shoulders and fixed pins on said base member and said gauge stop arranged to provide a plurality of predetermined locations at which said gauge stop may be set and retained against movement away from the cutter blades, said abutment shoulders being disposed in parallel planes spaced from and at an acute angle with respect to the cutter blades and being so arranged that the distance of the gauge stop from the cutter blades may be varied by increments smaller than the width of said fixed pins.

15. A gauge for a tile cutter comprising: a base member; fastening elements for securing said base member in predetermined relation to the blades of a tile cutter; a first plurality of closely spaced parallel rows of apertures disposed perpendicularly to the cutter blade, the apertures in each row being equidistant from one another, any aperture in one of said rows being located a predetermined distance from said cutter blade, and the corresponding aperture in any adjoining row being located a predetermined distance from the cutter blade which varies from the distance of said first named aperture by an amount less than the diameter of an aperture; a second plurality of rows of apertures identical with said first plurality of rows and disposed a substantial distance laterally therefrom; and a movable gauge stop provided with means for engaging corresponding apertures in said first and said second pluralities of rows.

16. A gauge for a tile cutter, comprising: a base member; fastening elements for securing said base member in predetermined relation to the blades of a tile cutter; a gauge stop provided with a pair of rigid, spaced pins; a plurality of pairs of spaced apertures in said base member adapted to receive said spaced pins, said pairs of apertures being so arranged as to permit said gauge stop to be secured at selected distances from said blades; and an auxiliary stop adapted to be secured to the base member with one end overlapping the gauge stop and clamping it to the base member.

ELMER LESSLEY WILLIAMS.

REFERENCES CITED

The following references are of record in the file of this patent:

UNITED STATES PATENTS

| Number | Name | Date |
|---|---|---|
| 377,500 | Sagendorph et al. | Feb. 7, 1888 |
| 484,832 | Van Wagenen | Oct. 25, 1892 |
| 2,289,985 | Nastri | July 14, 1942 |